March 30, 1943.    J. HERSON    2,314,883
DISTANCE INDICATOR AND SYSTEM
Filed July 9, 1941
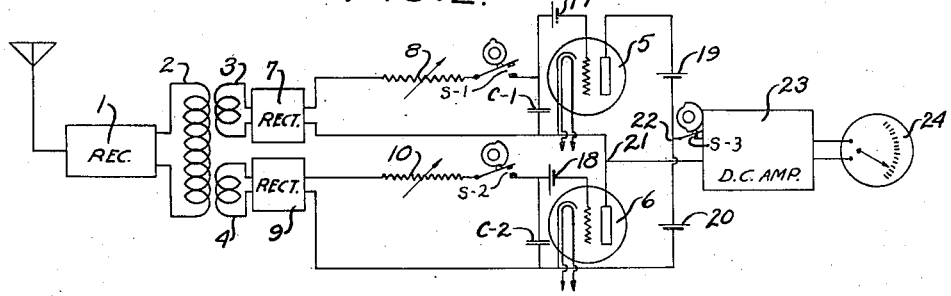
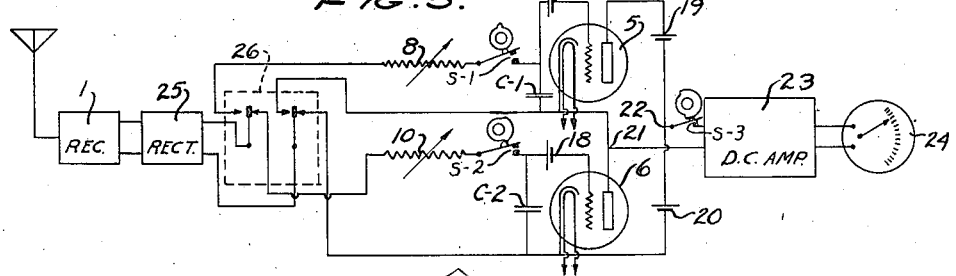
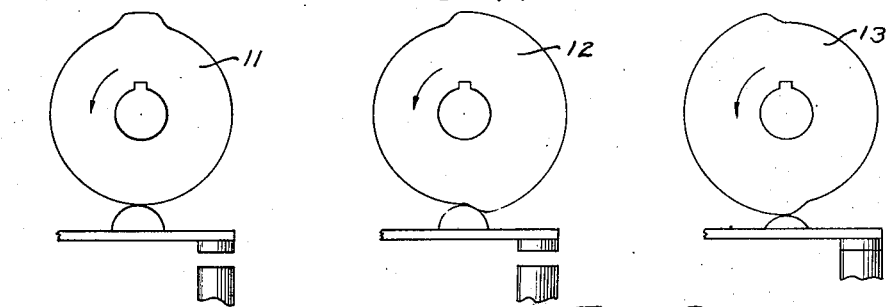
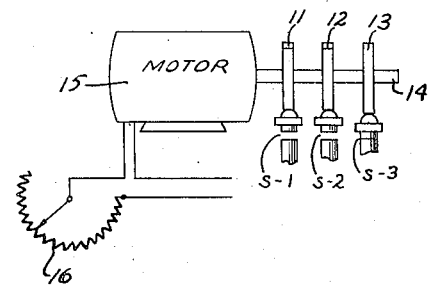
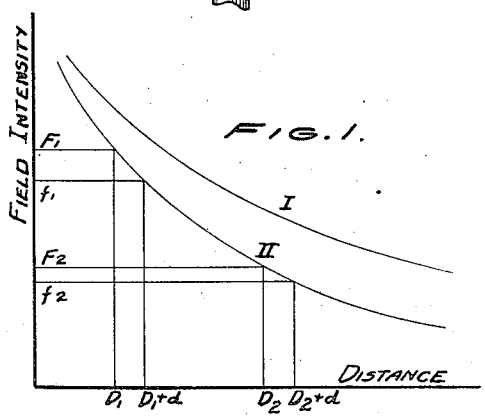
INVENTOR
JACOB HERSON
BY
ATTORNEYS Patented Mar. 30, 1943

2,314,883

UNITED STATES PATENT OFFICE 2,314,883

DISTANCE INDICATOR AND SYSTEM

Jacob Herson, Dayton, Ohio

Application July 9, 1941, Serial No. 401,617

9 Claims. (Cl. 250—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improvement in the art of navigation by means of radio and more particularly to a method and apparatus for enabling the operator of an aircraft or similar vehicle to ascertain the distance of his craft from a radio transmitting station on which he is flying by means of a radio compass. In order to keep the amount of radio equipment carried by the aircraft to a minimum, it is desirable that my invention be practised by using the radio compass receiver as a source of signal energy. Should this for any reason be found impracticable, any high-quality radio receiver may be used as a source of signal energy for practising my invention.

When a radio compass is used for "homing," i. e. guiding an aircraft towards a distant transmitter in a substantially straight line, the absolute radio bearing of the distant transmitter towards which the aircraft is "homing" is known throughout the flight. This information in itself, however, is not sufficient to completely determine the position of the aircraft since the distance of the craft from the transmitter is not known. As least one additional radio bearing on some other distant station must be obtained in order to fix the aircraft's position.

This invention provides a method for determining periodically the distance of a moving craft from a radio transmitter towards which it is moving at a substantially constant speed and thus locates the position of the aircraft without requiring additional bearings on other radio stations.

Accordingly, an important object of my invention is to provide a method for determining the distance of a moving airplane, or other vehicle, from a source of radio waves toward or away from which the vehicle is moving. This information together with a knowledge of the bearing taken on the same source of radio waves obtained with a radio direction finder which is well-known to the art, will therefore completely determine the position of the craft.

Another object of my invention is to provide an apparatus or system for periodically determining the distance of a moving vehicle from a source of radio waves toward or away from which it is moving at a substantially constant speed, by comparing the field strengths of the waves at different points which are equally spaced in point of time along the path of movement of the vehicle.

A further object of my invention is to provide a method for determining the distance of a moving vehicle from a source of radio waves toward or away from which it is moving in which the results are unaffected by the power output level of the source and depend instead only upon the distance of the device from the source.

Still a further object of my invention is the provision of a field strength comparing and indicating means which utilizes a radio compass receiver as its source of signal energy.

A preferred embodiment of the present invention will be hereinafter described with reference to the accompanying drawing, given merely by way of example, in which:

Fig. 1 is a graph showing the variation of field intensity with distance in the region of the ground wave and illustrating the underlying principle of my invention;

Fig. 2 is a schematic diagram showing one particular form of my invention;

Fig. 3 illustrates a mechanism for performing the switching operations required in the particular form of my invention shown in Fig. 2;

Fig. 4 shows in detail a part of the switching mechanism of Fig. 3;

Fig. 5 shows another form of my invention, differing in some details from that shown in Fig. 2.

The principle of the invention is based on the fact that there is a definite relation between the field strength and the distance from the source. The radiation field strength in the region of the ground wave varies substantially inversely as the distance from the transmitter. This relationship is modified by additional attenuation to a degree depending on the electrical characteristics of the earth, (conductivity and dielectric constant). For surfaces of high conductivity, such as the sea, the deviation from the inverse distance law is very small. It is clear that at a great distance from the source, the field strength varies very little with respect to distance, while near the source, the rate of change of the field strength with distance becomes very high. Thus, the ratio of the field strengths at two points separated by fixed known distance and lying in a direction perpendicular to the wave front is a measure of the distance of one of these points from the transmitter. A numerical example will serve for illustration. For simplicity, neglect the effect of the terrain, i. e., assume that the field strength varies inversely as the distance from the transmitter. Let the field strength 1 mile from the transmitter be 50,000 μv./m. Assume that we approach the transmitter from a great distance (say 100 miles) and measure the field strength at intervals of 1 mile. At distances of 99 and 100 miles the field strengths are $50,000/99$ μv./m. and $50,000/100$ μv./m. respectively and their ratio is 1-1/99. At distances of 19 and 20 miles, the field strengths are $50,000/19$ and $50,000/20$ μv./m. respectively and their ratio is 1-1/19. It will be noted that this ratio is independent of the power radiated and is a function of the distance from the transmitter only.

The principle is still applicable when the actual field strength departs from the inverse distance law. Thus in Fig. 1, curve I represents the variation of field strength in accordance with the inverse distance law. This may be modified by the earth and other causes so that the actual field strength is represented by curve II. The field strengths at points distance $D_1$ and $D_1+d$ are $F_1$ and $f_1$ respectively and their ratio is $F_1/f_1$. At points $D_2$ and $D_2+d$ the corresponding ratio is $F_2/f_2$. The ratio $F/f$ is therefore still a function of the distance and the change from curve I to curve II simply necessitates a different calibration of the final indicating instrument. The invention can obviously be applied to radio transmitters having directive radiation patterns such as radio beams and ranges in which case a still different calibration of the indicator will be required.

In practical applications, the distance ($d$ in Fig. 1) between the two points ($D_1$ and $D_1+d$) whose field strengths are being compared must be relatively great, say in the order of one mile, and simultaneous comparison cannot therefore be made since such wide separations cannot obviously be realized on the vehicle or craft. Some form of delayed measurements is therefore necessary. These delayed measurements might be made by having an operator on the vehicle take readings from a field strength measuring device at various points along the path of movement of the vehicle. A comparison of these readings could then be made in order to determine the ratio of one field strength to another thereby fixing the distance of the vehicle from the source of waves. However, in order to relieve the operator of this burden, I have devised an apparatus which will perform these steps and arrive at the desired result without any outside intervention. One method of accomplishing this is shown in Fig. 2 which shows diagrammatically the field strength comparing device designed for installation in the aircraft or other vehicle.

Part 1 is essentially a radio receiver (preferably the one used in the radio compass) arranged to produce an output proportional to the carrier field strength from the distant transmitter. This type of receiver is sometimes known as a field strength measuring receiver. The output of the receiver is fed into a transformer having one primary winding 2 and two matched secondaries 3 and 4. The output of the secondary 3 is rectified by the rectifier 7 which feeds a charging circuit consisting of the variable resistance 8, switch S—1 and condenser C—1, all connected in series. The opening and closing of switch S—1 is controlled by cam 11 mounted with two other cams 12 and 13 (the function of which will be explained later) on shaft 14 driven by electric motor 15 whose speed can be controlled by rheostat 16 which may be calibrated directly in ground speed. One side of condenser C—1 is also connected in series with biasing battery 17 to the grid of vacuum tube 5, the other side of this condenser being connected to the cathode of tube 5. The other transformer secondary 4 is associated with another channel similar to the one just described and consisting of rectifier 9, variable resistor 10, switch S—2 operated by cam 12, and condenser C—2, one side of which condenser connects to the grid of vacuum tube 6 in series with the biasing battery 18, the other side of the condenser, of course, being led to cathode.

Vacuum tubes 5 and 6, having similar characteristics, are, together with their respective plate batteries 19 and 20, all connected in series, the batteries being of the same voltage. Inequality in the plate currents of vacuum tubes 5 and 6 resulting from the difference in potential on the grids of the tubes will produce a voltage difference between points 21 and 22. This voltage difference is fed to the direct current amplifier 23 in series with switch S—3, the latter being controlled by cam 13. The output of the amplifier is indicated by the meter 24 connected thereto.

The switches S—1, S—2 and S—3 are made to open and close in a definite sequence by the proper shaping of the cams 11, 12 and 13. This sequence is as follows:

Initial condition: S—1 closed, S—2 closed, S—3 open.
(a) S—1 opens at the beginning of the cycle.
(b) S—2 opens and S—3 closes a definite interval after event (a).
(c) S—1 closes, S—2 closes, S—3 opens—a definite interval after (b) and the cycle is thus completed. The cycles are repeated continually during the operation of the device.

The variable resistors 8 and 10 are so adjusted that during the brief period of initial condition, both condensers C—1 and C—2 become equally charged to a degree depending upon the field strength which exists during that initial condition. Any inequalities in the biasing batteries 17 and 18, or in the bridge circuit batteries 19 and 20 may be compensated for in the adjustment of resistors 8 and 10. At the very beginning of the cycle S—1 opens (event a) and since the grids of the tubes draw no current by virtue of the biasing batteries 17 and 18, the charge on C—1 remains the same throughout the rest of the switching cycle. On the other hand, since switch S—2 remains closed the charge on condenser C—2 continues to vary in accordance with the changing field strength until event b takes place (S—2 opens and S—3 closes). During the remaining part of the cycle, i. e., between events b and c, when both contacts S—1 and S—2 are open, the charges on the condensers C—1 and C—2 correspond to the field strengths which existed at two different points occupied by the craft or vehicle at two respective instances separated by a definite time interval, i. e., the interval between event a and b of the switching cycle. By adjusting the speed of the cam driving motor 15 in accordance with the speed of the vehicle, this time interval may be made to correspond to a definite distance, say 1 mile. A periodic (every cycle) comparison between field strengths at points one mile apart will then be obtained. The final indication of actual distance from the source of radiation is obtained as follows: Again referring to Fig. 2, the vacuum tubes 5 and 6 and the two similar batteries 19 and 20 are all connected in series and constitute a bridge circuit, the vacuum tubes 5 and 6 being regarded as resistors varying in accordance with the corresponding grid voltages. If the grid voltages of both tubes are equal, their internal resistances are equal and no potential difference exists between the mid-point 21 of the tubes and that of batteries 22. If, however, the grid voltages of the tube are unequal, their internal resistances change in proportion to their grid voltages and there appears between points 21 and 22 a potential difference proportional to the ratio of the internal tube resistances and, therefore, to the grid voltages and to the field strengths in question. This potential difference is then amplified by the direct current amplifier 23, the output of which is indicated by the meter 24 during a part of every cycle while switch S—3 remains closed. The latter may be calibrated directly in miles from the source of radiation for various average terrains. The relationship between the input to the amplifier 23 and the distance to be measured is non-linear, the input decreasing rapidly as the distance increases. By designing the amplifier 23 to have a greater amplification at lower inputs, the range of the instrument can be extended and crowding at the high end of the scale avoided.

A somewhat different method of obtaining a comparison of field intensities from that shown in Fig. 2 is shown in Fig. 5. The output of the receiver 1 is fed into a single rectifier 25, the output of which is switched alternately by a mechanical vibrator 26 between two separate channels at a very rapid rate (say 20 to 30 times a second). From this point, the operation of the circuit is exactly the same as in Fig. 2 and as previously described. The charges on the condenser C1 and C2 are, as in Fig. 2, proportional to the field strengths to be compared. The operation of the rest of the circuit is not affected by the vibrator since its period of vibration is many times shorter than the duration of the cycle of operation of contacts S1 and S2.

Although only one method of performing the necessary switching operations is shown herein, it is not the intention to limit the invention to this one method, but any other suitable manner of opening and closing the contacts S1, S2 and S3 in the proper sequence may be used in place thereof. The form of the invention shown is for purposes of illustration only and it is to be understood that I intend to be limited only by the prior art and the scope of the appended claims.

What I claim as new and desire to secure by Letters Patent is:

1. In a system for determining the distance of a moving object from a predetermined point when radio waves are emitted from said point and said object is moving at substantially constant speed on line with said point, a field strength comparing device moving with said object and comprising a receiver having an output proportional to the field strength of the waves received, a plurality of individual storage means connected with the output of said receiver, means controlling said storage means to render the latter successively effective to store the output of said receiver at different points along the path of movement of said object, said points being equally spaced in point of time, and means connected with said storage means for determining the ratios of the quantities of energy stored at said different points to thereby establish the distance of said object from said point.

2. In a system for determining the distance of a moving object from a predetermined point when radio waves are emitted from said point and said object is moving at substantially constant speed on line with said point, a field strength comparing device moving with said object and comprising a receiver having an output proportional to the field strength of the waves received, a plurality of individual storage means connected with the output of said receiver, means controlling said storage means to render the latter successively effective to store the output of said receiver at different points along the path of movement of said object, said points being equally spaced in point of time, means connected with said storage means for determining the ratios of the quantities of energy stored at said different points, and an energy measuring and indicating device connected with said determining means for indicating the results of such determination and thereby establishing the distance of said object from said point.

3. In a system for determining the distance of a moving object from a predetermined point when radio waves are emitted from said point and said object is moving at substantially constant speed on line with said point, a field strength comparing device moving with said object and comprising a receiver having an output proportional to the field strength of the waves received, a plurality of storage circuits connected with the output of said receiver, a switching means for controlling said storage circuits to render the latter successively effective to store the output of said receiver at different points along the path of movement of said object, said points being equally spaced in point of time, means connected with said storage circuits for determining the ratios of the quantities of energy stored at said different points, and an energy measuring and indicating device connected with said determining means for indicating the results of such determination and thereby establishing the distance of said object from said point.

4. In a system for determining the distance of a moving object from a predetermined point when radio waves are emitted from said point and said object is moving at substantially constant speed on line with said point, a field strength comparing device moving with said object and comprising a receiver having an output proportional to the field strength of the waves received, a pair of storage circuits connected with said receiver, a cyclically operated switching means operable during each cycle of operation for controlling said storage circuits to render the latter successively effective to store the output of said receiver at two points along the path of movement of said object, means connected with said storage circuits for determining the ratio of the quantities of energy stored at said two points, and an energy measuring and indicating device, periodically connected with said determining means under the control of said switching means for indicating the results of such determination, whereby the distance of said object from said point is established at repeated intervals along the path of movement of said object.

5. In a system for determining the distance of a moving object from a predetermined point when radio waves are emitted from said point and said object is moving at substantially constant speed on line with said point; a field strength comparing device moving with said object and comprising a receiver having an output proportional to the field strength of the waves received; two identical storage circuits connected with the output of said receiver, each circuit including a rectifier for converting the alternating current output of the receiver to direct current, a condenser for storing the rectified current, and a switch for isolating the condenser from the rectifier; a vacuum tube bridge circuit connected with said storage circuits for determining the ratio of the charges on said condensers; a meter connected across said bridge circuit for indicating the results of such determination; a third switch for breaking the connection between said meter and said bridge circuit; and a cyclically operated mechanism for operating said three switches in timed sequence so as to repeatedly isolate first one and then the other of said condensers from the rectified output of said receiver after which the meter is connected to the bridge circuit to indicate the ratio of the charges on said condensers whereby the distance of said object from said point is repeatedly and intermittently indicated by said meter.

6. In a system for determining the distance of a moving object from a predetermined point when radio waves are emitted from said point and said object is moving at substantially constant speed on line with said point, a field strength comparing device moving with said object and comprising a receiver having an output proportional to the field strength of the waves received, a rectifier for converting the alternating current output of said receiver to direct current, two identical storage circuits for receiving and storing the output of said rectifier, each circuit including a storage condenser and a switch for isolating the condenser from the rectifier, a vibratory switching mechanism for alternately connecting first one and then the other of said storage circuits with the output of said rectifier in rapid sequence, a vacuum tube bridge circuit connected with said storage circuits for determining the ratio of the charges on said condensers, a meter connected across said bridge circuit for indicating the results of such determination, a third switch for breaking the connection between said meter and said bridge circuit, and a cyclically operated mechanism for operating said three switches in timed sequence so as to repeatedly isolate first one and then the other of said condensers from the rectified output of said receiver after which the meter is connected to the bridge circuit to indicate the ratio of the charges on said condensers to thereby repeatedly determine the distance of said object from said point.

7. The method of determining the distance of a moving object from a predetermined point when radio waves are emitted from said point and said object is moving on line with said point wherein a measure of the field strength of the waves is taken at each of two points separated by a known distance along the path of movement of said object, said measures of field strength then being compared and their ratio determined to thereby establish the distance of said object from said point.

8. The method of determining the distance of a moving object from a predetermined point when radio waves are emitted from said point and said object is moving on line with said point, wherein a measure of the field strength of the waves is taken at each of a plurality of points separated by known distances along the path of movement of said object, the measures of field strength at each of two adjacent points being then compared and their ratio determined to thereby repeatedly establish the distance of said object from said point.

9. The method of determining the distance of an aircraft from a predetermined point when radio waves are emitted from said point and said craft is moving on line with said point, wherein a measure of the field strength of the waves is taken at intervals of time along the path of movement of said craft, said intervals of time corresponding to known distances on the ground, the measures of field strength at the beginning and end of each interval then being compared and their ratio determined to thereby establish, periodically, the distance of said craft from said point.

JACOB HERSON.